United States Patent

[11] 3,627,798

[72] Inventor: Laird Gordon Lindsay Ward
Suffern, N.Y.
[21] Appl. No.: 869,905
[22] Filed: Oct. 27, 1969
[45] Patented: Dec. 14, 1971
[73] Assignee: The International Nickel Company, Inc.
New York, N.Y.

[54] PROCESS FOR PREPARING THE NICKEL DERIVATIVES OF METHYLENE BISPHENOL
11 Claims, No Drawings

[52] U.S. Cl. .................................................. 260/439 R, 260/45.75 N
[51] Int. Cl. .................................................. C07f 15/04, C08f 45/62
[50] Field of Search .................................................. 260/439, 45.75 N; 252/42.7

[56] References Cited
UNITED STATES PATENTS

| | | | |
|---|---|---|---|
| 2,971,968 | 2/1961 | Nicholson et al. | 260/439 |
| 3,321,502 | 5/1967 | Soeder | 260/439 |
| 3,346,447 | 10/1967 | Wright | 167/31 |
| 3,390,160 | 6/1968 | Heller et al. | 260/433 |
| 3,437,620 | 4/1969 | Yamamoto | 260/23 |

OTHER REFERENCES

Teramura et al. Chem. Abst. 68 p. 1360, abstract of Japanese Patent 5424– (67)

Kirk– Othmer, Encyclopedia of Chemical Technology Interscience Publishers, N.Y., N.Y., Vol. 13, 1967, p. 754– 755

Primary Examiner—Tobias E. Levow
Assistant Examiner—A. P. Demers
Attorney—Maurice L. Pinel ABSTRACT: A process for preparing nickel derivatives of methylene bisphenols in which a methylene bisphenol, a Group Ia metal alkoxide and a nickel salt are reacted in an essentially nonaqueous environment, and the nickel derivative is precipitated from solution. Novel nickel derivatives of methylene bisphenol, e.g., nickel hexachlorophene, are effective as light stabilizing additives in vinyl polymers.

PROCESS FOR PREPARING THE NICKEL DERIVATIVES OF METHYLENE BISPHENOL

This invention relates to a novel process for preparing nickel compounds which are derivatives of methylene bisphenols and, more particularly, to novel stabilizing compounds for vinyl polymers, such as polyvinylchloride.

Attempts to prepare nickel salts of methylene bisphenols, such as hexachlorophene, in aqueous media, have thus far not met with success. It is desirable that a method suitable for the preparation of such compounds be provided.

Polyvinylchloride (PVC) and related vinyl polymers are light sensitive and suffer degradation including both discoloration and embrittlement upon exposure to light. Many attempts have been made to stabilize these polymers by introducing various additives, and improvement in the stability of these materials upon exposure to light has been achieved in some cases. However, more effective and more economical stabilizers are needed.

A new process has now been discovered in which a methylene bisphenol, a Group Ia metal alkoxide and a nickel halide are reacted to precipitate a nickel derivative of methylene bisphenol.

It has further been discovered that the novel compounds prepared by the process of the invention are useful as light stabilizers for vinyl polymers.

It is an object of the invention to provide a process for making the nickel derivative of hexachlorophene.

Another object of the invention is to provide a vinyl polymer having improved stabilization characteristics against degradation by light.

Other objects and advantages will become apparent from the following description.

Generally speaking, the present invention contemplates a process for making nickel derivatives of methylene bisphenols having the general formula,

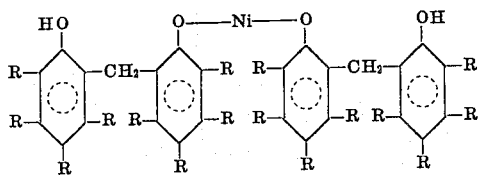

in which R is selected from the group consisting of hydrogen; halogens, e.g., chlorine; alkyls, e.g., butyl; substituted alkyls, e.g., tertiary butyl; aryls, e.g., phenyl; alkylaryls, e.g., methylphenyl; arylalkyls, e.g., benzyl; or combinations thereof. The compounds provided in accordance with the invention are useful as light stabilizing additives for vinyl polymers such as polyvinylchloride and polyvinyl acetate.

More particularly, the nickel derivatives of methylene bisphenols are prepared by reacting a methylene bisphenol having the general formula,

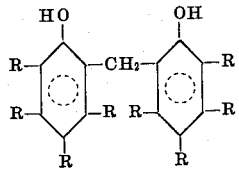

in which R is selected from the group consisting of hydrogen; halogens, e.g., chlorine; alkyls, e.g., butyl; substituted alkyls, e.g., tertiary butyl; aryls, e.g., phenyl; alkylaryls, e.g., methylphenyl; arylalkyls, e.g., benzyl; or combinations thereof; a Group Ia metal alkoxide, which advantageously is the reaction product of a Group Ia metal, e.g., lithium, sodium or potassium, and an alcohol having from one to four carbon atoms, e.g., methanol, ethanol, propanol, isopropanol, n-butanol, isobutanol or sec-butanol; and an anhydrous, or substantially anhydrous, nickel halide; in an essentially nonaqueous solvent, particularly one selected from the group consisting of methanol, ethanol, propanol, isopropanol, n-butanol, isobutanol, sec-butanol, acetone, tetrahydrofuran, dimethoxyethane and dimethylformamide; and precipitating the nickel derivative.

The methylene bisphenol used in the process is beneficially hexachlorophene having the general structure,

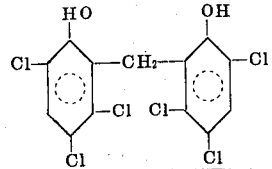

although other suitable methylene bisphenols can be employed. With regard to the Group Ia metal alkoxide, rubidium and cesium are highly reactive Group Ia metals and for that reason are less desirable for the contemplated reaction to produce an alkoxide. Also, rubidium chloride is not very soluble in alcohol, and cesium chloride is quite hygroscopic, these properties being disadvantageous in the reactions of the invention as will be more fully explained hereinafter. While the anhydrous nickel halide can be used in its pure form as a reactant to the extent that it is soluble in the nonaqueous solvent, it is advantageous to provide the nickel halide in the more soluble form of an anhydrous organic complex. Such a soluble organic complex may be prepared by reacting the hydrated nickel halide (chloride, bromide or iodide) with peroxide-free, ethylene-glycol dimethylether (monoglyme). The product of this reaction is nickel halide dimethoxyethanate (nickel halide·EGDE complex). The nickel halide·EGDE complex is quite soluble in alcohol and it is also soluble in acetone, tetrahydrofuran, dimethoxyethane and dimethylformamide.

The alcohols employed in the process, which desirably contain from one to four carbon atoms, may function as solvents as well as reactants, i.e., the stoichiometric amount of alcohol functioning as a reactant while the excess alcohol functions as a solvent. Alcohols having more than four carbons atoms are less reactive at the reaction temperatures characterizing this process and, for that reason, are not as well suited for use as solvents, although they will react with the alkali metal. Alcohols having up to 12 carbon atoms may be used as reactants, but the increasing viscosity of the higher alcohols, e.g., isoamyl alcohol, slows the desired reactions, and the system may have to be heated to obtain the reaction. Further, no particular benefit is secured by employing the higher alcohols. Under normal conditions, the tert-butyl alcohol does not react with lithium or sodium.

In order to obtain a relatively pure product upon precipitation of the nickel derivatives of methylene bisphenols from solution, it will be understood that the byproduct of the reaction, i.e., the alkali metal halide, must be soluble in the solvent employed to facilitate separation of the product from the byproduct. Since alcohols are advantageous solvents, it will be apparent that reactants which result in the production of byproducts which are relatively insoluble, or only slightly soluble, in alcohol, such as lithium fluoride, sodium fluoride, sodium chloride, sodium bromide, potassium fluoride, potassium chloride, potassium bromide rubidium fluoride, rubidium bromide and cesium fluoride, are unsuitable for the practice of this process, if an alcohol is used as solvent.

It is possible, though less convenient, to use other solvents in the process (with alcohol functioning only as a reactant) including acetone, tetrahydrofuran, dimethoxyethane and dimethylformamide. The nickel halide ·EGDE complex and the byproduct alkali metal halides such as lithium chloride, lithium iodide, lithium bromide, sodium iodide, potassium iodide, rubidium iodide, cesium chloride, cesium bromide and cesium iodide will dissolve in these solvents.

The sequence in which the reactions of the invention are conducted is of significant importance. Thus, the methylene bisphenol is first reacted with the Group Ia metal alkoxide to form a Group Ia metal methylene bisphenolate. The Group Ia metal methylene bisphenolate is reacted with a nickel dihalide whereupon the Group Ia metal ions of two molecules of the bisphenolate are replaced by nickel which links the two molecules, and the products of the reaction are nickel dimethylene bisphenolate and a Group Ia metal halide. A direct reaction does not readily occur between nickel dihalide and methylene bisphenol because there is insufficient driving force for this reaction.

The desired reactions do not occur when attempted in aqueous solution. It has been found, for example, that, in aqueous solution, precipitation of hexachlorophene occurs if the pH of the solution falls below approximately 8. On the other hand, when the pH of the solution is raised to keep hexachlorophene in solution, nickel hydroxide is formed and the desired product, nickel hexachlorophenate, is not achieved. Accordingly, care must be taken to assure that the reactions are carried out under nonaqueous conditions.

After the reaction, the resultant fluid mixture is concentrated by evaporation of methanol, and then cooled to precipitate the crystalline product which can then be separated from the remaining fluid by filtration. The crystalline material obtained is then rinsed in anhydrous alcohol to remove impurities and alcohol-soluble byproducts, and dried under anhydrous conditions, e.g., dry nitrogen, to avoid possible contamination with water. Drying may also be accomplished under vacuum, but in that case, the temperature should be no higher than 26° C. to minimize loss of the methanol of crystallization.

The use of the nickel compounds as light stabilizers for vinyl polymers such as polyvinylchloride, calls for mixing the nickel compounds with the polymer, for example, in a small but effective proportion of up to 10 parts by weight of compound, e.g., 1 part by weight of compound per 100 parts by weight of the polymer, and with other necessary ingredients, at a temperature from about 75° F. to 285° F., until the powder mixture is well blended and then, after cooling, extruding the powder mixture or otherwise processing it to final form.

Ordinarily, a minimum of at least 0.25 part by weight of compound, per 100 parts by weight of polymer is required to effect a substantial degree of stabilization. A highly satisfactory addition is about 1 part by weight of compound, per 100 parts by weight of polymer. This treated polymer is characterized by a substantial ability to resist degradation upon exposure to natural or artificial light for and extended period.

In order to give those skilled in the art a better understanding of the invention, particularly the preparation of compounds in accordance with the invention, the following illustrative example is given:

EXAMPLE

Preparation of Nickel Bromide Dimethoxyethanate (Nickel Bromide·EGDE Complex)

3.5 liters of peroxide-free ethylene-glycol dimethylether (monoglyme) and 600 grams (2.36 moles) of nickel bromide dihydrate were vigorously stirred and heated at reflux temperature (80° C.) for approximately 30 hours in a 5 liter round bottom Morton flask with a flange neck. The flanged cap was equipped with a suitable stirrer, two Soxhlet extractors and appropriate condensers, and during refluxing it was necessary to recharge the thimbles with fresh desiccant ($CaH_2$). The dehydration was followed by periodic Karl Fischer titrations. When a titration indicated a water content <0.04 mg./ml. solvent, the salmon pink granular nickel bromide complex was filtered off under nitrogen, and dried under nitrogen, with the intermittent application of a vacuum. The yield (740 grams, 2.4 moles) was quantitative. The calculated analysis for $NiBr_2 \cdot CH_3OCH_2CH_2OCH_3$, the empirical formula for nickel bromide dimethoxyethanate, was as follows: 15.5% carbon; 3.27% hydrogen; 51.78% bromine; 19.02% nickel; balance oxygen. The observed analysis was 15.78% carbon; 3.26% hydrogen; 51.97% bromine; 19.25% nickel; balance oxygen.

Preparation of Nickel Hexachlorophenate

Nickel di-(2,2')-methylene-3,4,6-Trichlorophenol-3,4',6'-trichlorophenate·$6CH_3OH$ 8 grams (1.2 g. atom) of lithium was added to a flask containing 1,500 milliliters of absolute methanol under a nitrogen atmosphere producing a solution of lithium methoxide. The solution of lithium methoxide was refluxed at 65° C. and during this operation 488 grams (1.2 moles) of hexachlorophene was added. This mixture was refluxed at 65° C. for 0.5 hour and then a solution of 186 grams (0.6 mole) of anhydrous nickel bromide·EGDE complex in 600 milliliters of methanol was added. The hot (55° C.) yellow-green reaction mixture was then reduced to a volume of about 1.5 liters and then cooled by immersing the flask in an ice/salt mixture. The resulting light green, finely crystalline product which precipitated was filtered off, rinsed twice with cold (25° C.) anhydrous methanol and dried in a slow stream of dry nitrogen.

The product and two subsequent crops of crystals obtained from the mother liquor totaled 466 grams (73% of theory based on $C_{32}H_{34}Cl_{12}NiO_{10}$). The melting point of the compound (samples inserted at 105° C.) was 115°-118° C., at which temperature the compound decomposed.

The calculated analysis for $C_{32}H_{34}Cl_{12}NiO_{10}$, the empirical formula for nickel hexachlorophenate·$6CH_3OH$, was as follows: 36.16% carbon; 3.22% hydrogen; 40.03% chlorine; 5.52% nickel. The calculated loss in weight upon removal of six equivalents of methanol was 18.43%. The observed loss, on drying the compound for 4 hours at 110° C. in vacuum, was 18.09%. The calculated analysis for the residue after removal of methanol was: 35.87% carbon; 1.16% hydrogen; 48.87% chlorine; 6.74% nickel. The observed analysis of the residue was: 36.07% carbon; 1.20% hydrogen; 48.26% chlorine; 6.78% nickel. The melting point of the residue was 163° C., at which temperature it decomposed. The reactions are believed to take place as follows:

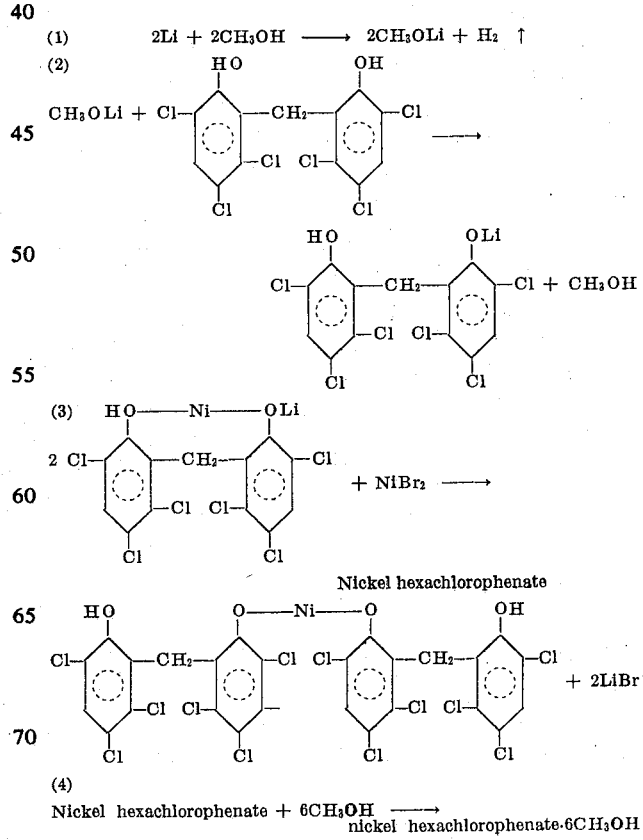

Hexamethanol nickel hexachlorophenate may also be prepared from monogylme-complexed nickel chloride. However, the bromide is preferred since the byproduct, lithium bromide, has a higher solubility in the methanol solvent reaction medium, and thus contamination of the product with lithium salts is minimized. Further, an anhydrous solution of nickel halide in a mixture of ethyl alcohol and ethyl formate is also satisfactory for the preparation of nickel hexachlorophenate. Such nickel halide complex is prepared by reacting a hydrated nickel halide with triethyl orthoformate. A reaction of the following type is believed to take place:

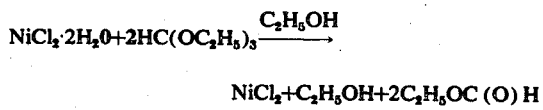

The nickel halide solution thus obtained may then be reacted with a Group Ia metal methylene bisphenolate as described above to produce the desired end product.

Nickel hexaclorophenate (Compound 1 ) was evaluated as a light stabilizer by incorporation in polyvinylchloride (PVC) film samples. In preparing the PVC film, nickel hexachlorophenate ·6CH$_3$OH was added in the amount of 1 part by weight of the nickel compound to 100 parts by weight of the PVC powder in a dry mixing head of the Brabender Plastograph sigma blade mixer. The mixture was heated to 200° F. during mixing and then the temperature was raised to 230° F., and the mixture was heated for additional 10 minutes. At this point, 50 parts of dioctyl phthalate, a plasticizer, and two parts of a gylceride lubricant (Glycoluble RP) were added. The batch was dry blended for 45 minutes at 260° F. to 280° F., and then cooled. The blended powder was then transferred to an extruder hopper and fed into the extruder screw. The extrusion was carried out at a temperature of 300° F. and a 2 inch wide by 0.01 inch thick film was extruded. The film was cut into about 9 inch lengths which were clamped in suitable holders under slight tension with about 8½ inches exposed for weathering. Film holders were provided with PVC film samples incorporating the stabilizing nickel compound of the invention as well as with uninhibited PVC film samples (blanks). The PVC film samples were exposed in a carbon arc illuminated weatherometer to provide accelerated weathering conditions. The cycle time on accelerated weathering was 102 minutes of simulated sunshine (carbon arc illumination) followed by 18 minutes of simulated sunshine and rain (water spray). The results obtained are set forth in the following table:

| Film Samples | Hours to Failure | Type of Failure |
|---|---|---|
| Blank A | 230 | Brittle, Black |
| Blank B | 234 | Brittle, Black |
| Blank C | 270 | Brittle, Black |
| Blank D | 229 | Brittle, Black |
| Compound 1 | 908 | Brittle (No discoloration) |

It is seen that the uninhibited samples (blanks) exposed failed consistently at less than 300 hours. Nickel hexachlorophenate ·6CH$_3$OH clearly stabilizes polyvinylchloride against degradation upon exposure to light, time to failure being more than three times that of the uninhibited samples. Similar results are obtained using nickel hexachlorophenate, without associated methanol since, in any case, the methanol is driven off during the heat mixing process.

An efficient and relatively simple process has thus been presented for the preparation of nickel hexachlorophenate and usefulness of this nickel compound has been demonstrated as a light-stabilizing additive for vinyl polymers.

It is contemplated that nickel compounds described herein may have application, not only as stabilizing additives for vinyl polymers, but for polyolefins as well, e.g., polyethylene and polypropylene.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

I claim:

1. The process for preparing nickel hexachlorophenate which comprises the steps of,
    a. reacting in an essentially nonaqueous solvent selected from the group consisting of methanol, ethanol, propanol, isopropanol, N-butanol, isobutanol, sec-butanol, acetone, tetrahydrofuran, dimethoxyethane and dimethylformamide, hexachlorophene having the formula,

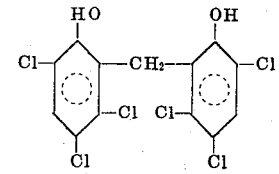

with a Group Ia metal alkoxide, the reactants being employed in amounts such that the ratio of the Group Ia metal ions to the CH$_2$ bridging group of the hexachlorophene is essentially 1:1;
    b. reacting an essentially anhydrous nickel halide with the reaction product of step (a), the amount of nickel halide introduced being such that the ratio of nickel ions to the CH$_2$ bridging groups in solution is essentially 1:2 ; and
    c. precipitating the resulting nickel hexachlorophenate.
2. The process of claim 1 wherein the solvent is methanol.
3. The process of claim 1 wherein the solvent is methanol and the essentially anhydrous nickel halide is selected from the group consisting of a nickel halide dimethoxeythanate complex and an anhydrous solution of nickel halide in a mixture of ethyl formate and ethyl alcohol.
4. The process of claim 1 wherein the metal alkoxide reactant is the reaction product of a Group Ia metal selected from the group consisting of lithium, sodium and potassium, and an alcohol selected from the group consisting of methanol, ethanol, isopropanol, n-butanol, isobutanol and sec-butanol.
5. The process of claim 3 wherein the Group Ia metal alkoxide reactant is the reaction product of a Group Ia metal selected from the group consisting of lithium, sodium and potassium, and an alcohol selected from the group consisting of methanol, ethanol, propanol, isopropanol, n-butanol, isobutanol and sec-butanol.
6. The process of claim 5 wherein the solvent is methanol.
7. The process of claim 1 wherein the Group Ia metal alkoxide reactant is the reaction product of lithium and methanol.
8. The process of claim 7 wherein the solvent is methanol.
9. The process of claim 1 wherein the Group Ia metal alkoxide reactant is lithium methoxide and the essentially anhydrous nickel halide is the reaction product of nickel bromide dihydrate and ethylene-glycol dimethylether.
10. A process of preparing nickel hexachlorophenate ·6CH$_3$OH under anhydrous conditions which comprises first reacting, in methanol, hexachlorophene and lithium methoxide, then introducing as a reactant nickel bromide dimethoxyethanate, and thereafter precipitating nickel hexachlorophenate ·6CH$_3$OH.
11. A nickel compound having the general formula,

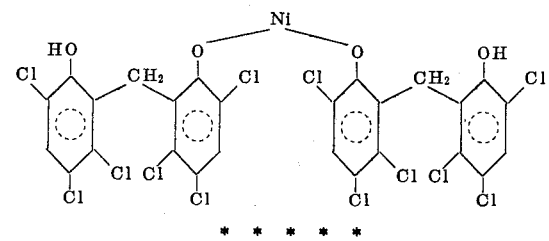

* * * * *

UNITED STATES PATENT OFFICE
CERTIFICATE OF CORRECTION

Patent No. 3,627,798     Dated December 14, 1971

Inventor(s) LAIRD GORDON LINDSAY WARD

It is certified that error appears in the above-identified patent and that said Letters Patent are hereby corrected as shown below:

Col. 6, line 5 of claim 4, after "ethanol," insert --propanol,--.

Signed and sealed this 29th day of October 1974.

(SEAL)
Attest:

McCOY M. GIBSON JR.
Attesting Officer

C. MARSHALL DANN
Commissioner of Patents